May 25, 1943.  P. D. ZURIAN  2,319,898

TELEPHOTO METHOD AND APPARATUS

Filed Aug. 27, 1941

PHILIP D. ZURIAN
INVENTOR

BY John J. Logan
ATTORNEY

Patented May 25, 1943

2,319,898

UNITED STATES PATENT OFFICE 2,319,898

TELEPHOTO METHOD AND APPARATUS

Philip D. Zurian, Hicksville, N. Y., assignor to Press Wireless, Inc., Chicago, Ill., a corporation of Delaware Application August 27, 1941, Serial No. 408,421

8 Claims. (Cl. 178—7.1)

This invention relates to telephoto systems and more especially to methods and means for scanning in such systems.

A principal object of the invention is to provide a novel method and means for scanning photographic negatives and the like for telephoto transmission.

Heretofore in telephoto systems where the original subject matter at the transmitter is a photographic negative, it has been usually necessary to scan the negative by light transmitted through the negative. This has required the use of a glass or other transparent scanning drum on which the negative is supported, so that the scanning beam can pass through the negative and thence through the drum to the interior thereof. Inside the drum is located an optical system which may include a photo-electric cell whereby the light values transmitted through the negative are converted into electric impulses. These prior arrangements are subject to a number of drawbacks. For example since the optical system must be located interiorly of the drum it renders the manufacture and assembly of the electro-optical mechanism as a whole quite costly. Secondly, the scanning beam must not only pass through the thickness of the photographic negative but must also pass through the transparent wall of the scanning drum where it is subjected to considerable absorption and modification. While it is possible to use so-called reflected light scanning in connection with photographic negatives, there are certain difficulties which render this type of scanning relatively inefficient for such use. One of these difficulties is that the scanning light is, to a certain degree, reflected from the smooth surface of the negative regardless of the shade value of the particular elemental area being scanned thus reducing the range of the desired light modulation to such an extent that it renders this method unsuitable for transmission by ordinary means. In such cases it has been customary to use a positive print of the negative for scanning. Another difficulty is the light diffusion that is caused by the body of the negative itself. Accordingly it is another principal object of this invention to provide a method and means whereby the usual reflected light type of scanning machine can be used to scan either photographic positives, printed matter and the like, as well as photographic negatives.

A feature of the invention relates to a method of scanning a transparency such as a photographic negative, by using a backing of luminescent material such as phosphorescent material, fluorescent material and the like.

Another feature relates to a method of telephoto transmission which avoids the necessity of first making a positive print of a subject for scanning.

A further feature relates to the novel organization, arrangement and relative location of parts which constitute an improved system of scanning.

Other features and advantages not specifically enumerated will be apparent after a consideration of the following detailed descriptions and the appended claims.

Inasmuch as the invention relates to methods and means for telephoto scanning, only those portions of a telephoto system are shown in the drawing as are sufficient to enable the inventive concept to be understood. Accordingly in the drawing, Fig. 1 is a diagrammatic view of a typical telephoto scanning system embodying features of the invention.

Figure 1:
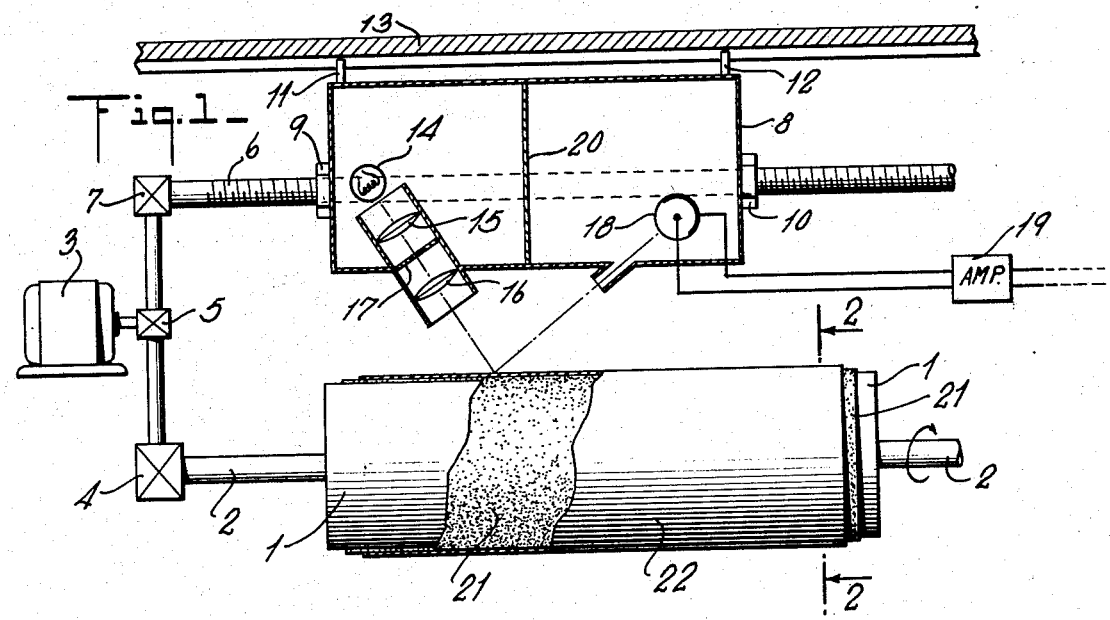
Figure 2:
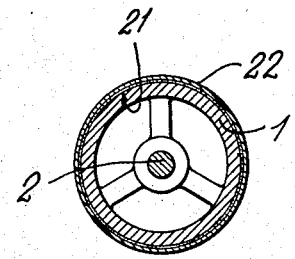
Fig. 2 is a sectional view of part of Fig. 1 taken along the line 2—2 thereof.

Referring to Fig. 1 the numeral 1 represents schematically any well-known form of scanning drum or platen such as is customarily employed in the telephoto transmission arts. The drum is mounted for rotation on a shaft 2 which is mounted in suitable bearings and rotated at the required speed by a motor 3 through suitable gearing 4, 5. Arranged parallel to the drum shaft is another threaded shaft 6 which is driven through suitable gears 7 by motor 3. Supported on shaft 6 is a housing or scanning head 8 which has fastened thereto a pair of split nuts 9, 10, to engage the thread on shaft 6. Housing 8 is restrained in any suitable manner against rotation, for example by means of projections 11, 12, riding in a longitudinal slot in guide bar 13. Consequently as shaft 6 rotates, the housing 8 is advanced parallel to the axis of drum 1, a small distance, e. g., 0.01 inch for each revolution of drum 1.

The housing 8 carries any well-known form of optical system for producing a minute scanning light spot at, or adjacent, the surface of drum 1. There is schematically shown for this purpose a spot lamp 14 with associated lenses 15, 16, and an apertured mask or plate 17 with a minute opening whereby there is projected on to the surface of drum 1 the desired elemental scanning light spot. Also carried by the housing is any well-known light sensitive cell 18 which responds to the light reflected from the drum to produce current impulses in the manner well-known in the facsimile arts. These impulses are fed to a suitable amplifier 19 whose output is used to control any well-known modulating arrangement whereby the picture current impulses are converted into amplitude modulations of a carrier wave, or are converted into a frequency-modulated audio frequency spectrum. The lamp and cell are shielded from each other against direct illumination by baffle 20.

Heretofore where such equipment has been used to scan photographic subjects the subject in the form of a positive print or sheet is wrapped around the drum 1, and the shade values or variations of the successive elemental areas are scanned by the light spot from lamp 14. However, if the subject is a transparency, e. g., a photographic negative, the light from source 7 which is reflected to cell 18 is much more limited in intensity variation range or modulation as compared with the range from a corresponding positive print. Furthermore the light beam in travelling through the body of the negative is dispersed or diffused so that the actual light reaching the cell is not truly representative of certain shade gradations in the negative. Consequently, it is not feasible to transmit the full detail or range of shade values of the negative. I have found that these disadvantages are overcome, while still using the conventional reflected light method, by providing a luminescent backing 21 for the negative or transparency 22. This luminescent backing may be of any well-known phosphorescent material or mixture of materials which may be applied in the form of a paint, e. g., by spraying, brushing, dipping, on to the peripheral surface of the drum 1. Consequently as the scanning light spot from source 7 passes through the negative 22, it will excite the luminescent backing with the result that the cell 18 will "see" successively illuminated elemental areas. The excitation of the cell will therefore be effected not only by the light which is normally reflected from the peripheral surface of the negative by the scanning beam, but also by the luminescence of the corresponding elemental area of the backing 21. In other words, the luminescent backing will act as if it were a separate light source located between the negative and drum and the amount of light emitted from the backing at any given point will be a function of the transparency of the negative at that point.

I have also found that by using for the backing, phosphorescent materials of considerable lag, it is possible to expose the entire backing through the negative by a single large beam as distinguished from the elemental scanning beam from lamp 14. Thus there can be produced on the backing 20 a complete luminescent record of the negative which may last for as long as several hours, and the negative can then be removed and the luminescent record itself scanned in successive elemental areas.

If desired, the drum 1 with its luminescent backing and with the negative thereon, can be enclosed in a light-proof housing so that the only light which excites the backing is that transmitted through the negative from the source 14.

Figure 3:
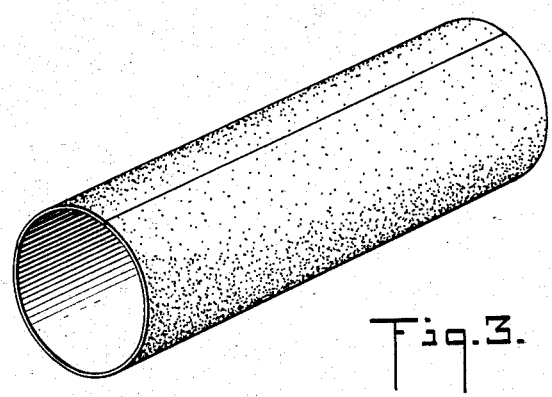
Fig. 3 is a perspective view of a modification of Fig. 1.

Instead of providing the luminescent backing in the form of a coating directly on drum 1, it may be in the form of a separate web or tubular member which can be wrapped around or telescoped over the drum. Such an arrangement is shown in Fig. 3 wherein the backing is in the form of a split tube of pliable material such as paper, cardboard, "Cellophane" or the like having its outer surface provided with a layer or coating of the luminescent material. If desired the luminescent material may be applied to one surface of the transparency 22 and this coated transparency is then wrapped around the drum 1 with the luminescent coating adjacent the drum surface.

While certain specific embodiments and materials have been mentioned, it will be understood that various changes and modifications may be made therein without departing from the spirit and scope of the invention.

What I claim is:

1. A telephoto scanning system comprising a phosphorescent surface, means to produce on said surface a phosphorescent record of a subject whose image is to be transmitted and means to convert the light emitted from successive elemental areas of said phosphorescent record into corresponding electric facsimile signals.

2. Telephoto scanning means for a transparency such as a photographic negative to be scanned, a support for said negative, a layer of luminescent material located between said negative and said support, means to illuminate said layer in successive elemental areas by a scanning beam which is modulated in accordance with the transparency characteristics of the elemental areas of the said negative, and a light sensitive cell positioned with respect to said negative so as to be excited by the light emitted from said layer in response to illumination by said scanning beam.

3. In a telephoto scanning system, a support for carrying a transparency to be scanned, a layer of luminescent material between said support and said transparency, means to illuminate said layer in successive elemental areas by a scanning beam modulated in accordance with the corresponding elemental areas of the transparency, and a light-sensitive cell responsive to the light emitted by the successive elemental areas of said luminescent layer for producing corresponding facsimile current signals.

4. In a telephoto scanner, a support carrying a transparency to be scanned, said support carrying a layer of luminescent material to provide a backing for said transparency, and means to illuminate said backing to produce thereon a phosphorescent record of the subject matter of the transparency for telefacsimile scanning.

5. A scanning drum for telephoto systems or the like, said drum carrying a layer of luminescent material which is arranged to be rendered luminous under control of a telephoto scanning beam to produce on said layer a record of the subject to be transmitted, and means to scan said record to produce facsimile signals corresponding to the light emitted from successive elemental areas of said layer.

6. In combination a telephoto scanning platen, a transparency to be scanned, a web having a layer of luminescent material located between said platen and said transparency, and means to illuminate and scan said layer of luminescent material to produce facsimile signals in accordance with the light emitted from successive elemental areas thereof.

7. Telephoto scanning means according to claim 1 in which said luminescent material is phosphorescent.

8. Telephoto scanning means according to claim 1 in which said luminescent material is fluorescent.

PHILIP D. ZURIAN.